United States Patent [19]

Choukh et al.

[11] Patent Number: 5,753,131
[45] Date of Patent: May 19, 1998

[54] MAGNETORESISTIVE DEVICE AND MANUFACTURING METHOD THEREOF

[75] Inventors: Alexandre M. Choukh, Suwon; In-eung Kim, Seoul, both of Rep. of Korea

[73] Assignee: Samsung Electronics Co., Ltd., Suwon, Rep. of Korea

[21] Appl. No.: 803,133

[22] Filed: Feb. 18, 1997

Related U.S. Application Data

[62] Division of Ser. No. 587,784, Dec. 26, 1995.

[30] Foreign Application Priority Data

Jun. 30, 1996 [KR] Rep. of Korea ............ 95-19056

[51] Int. Cl.[6] .................................................. B44C 1/22
[52] U.S. Cl. ............................................ 216/22; 216/41
[58] Field of Search ............... 216/22, 41; 427/130, 427/131

[56] References Cited

U.S. PATENT DOCUMENTS

| | | |
|---|---|---|
| 3,864,751 | 2/1975 | Beaulieu et al. . |
| 4,663,685 | 5/1987 | Tsang . |
| 4,785,366 | 11/1988 | Krounbi et al. . |
| 4,914,538 | 4/1990 | Howard et al. . |
| 5,079,035 | 1/1992 | Krounbi . |
| 5,344,669 | 9/1994 | Chen et al. . |
| 5,436,777 | 7/1995 | Soeya et al. . |
| 5,436,778 | 7/1995 | Lin et al. . |
| 5,438,470 | 8/1995 | Ravipait et al. . |
| 5,475,550 | 12/1995 | George . |
| 5,483,403 | 1/1996 | Voegeli . |
| 5,492,720 | 2/1996 | Gill et al. . |
| 5,600,518 | 2/1997 | Koga . |
| 5,637,235 | 6/1997 | Kim et al. ............ 216/22 |

*Primary Examiner*—William Powell
*Attorney, Agent, or Firm*—Burns, Doane, Swecker & Mathis, L.L.P.

[57] ABSTRACT

A magnetoresistive device with suppressed Barkhausen noise for restraining a cross-talk from adjacent tracks recorded on a magnetic medium, and a manufacturing method thereof. The width of the middle portion of a detection area in a magnetoresistive layer is thicker than that of shoulder portions. In the magnetoresistive device, the shoulder portions, which perform exchange coupling with the antiferromagnetic exchange layer, show a weak reaction to external magnetic field due to the high coercive force of the shoulder portions and a smaller thickness of the magnetoresistive layer than that of the detection area. Thus, when information on any one track of an information medium is read out through the detection area, the shoulder portions only slightly react to the external magnetic field of the adjacent tracks, i.e., the affect on the detection area by the shoulder portions is minimized.

10 Claims, 4 Drawing Sheets

MAGNETORESISTIVE DEVICE AND MANUFACTURING METHOD THEREOF

This application is a divisional of application Ser. No. 08/587,784, filed Dec. 26, 1995.

BACKGROUND OF THE INVENTION

The present invention relates to a magnetoresistive device and a manufacturing method thereof, and more particularly, to a magnetoresistive device which effectively prevents the generation of noise due to a crosstalk effect, and to a manufacturing method thereof.

The increase of recording density on a recording medium such as a hard disk is attained by narrowing of track width on the recording medium, thus rendering the accurate reproduction of densely recorded information difficult. As a result, crosstalk (i.e., the interference of information from adjacent tracks recorded on a magnetic medium during reproduction) occurs when the width of a magnetoresistive layer of a magnetoresistive device is greater than the track width. Further, unnecessary information, in the form of noise generated by the crosstalk, is mixed with desired information.

FIG. 1 shows a schematic structure of a conventional magnetoresistive device for information reproduction of a magnetoresistive head.

A soft magnetic layer 2, a spacer layer 3 and a magnetoresistive layer 4 are successively deposited on a substrate 1. Electrical junction port layers 5 are formed on both shoulder portions on an upper surface of magnetoresistive layer 4. Thus, a detection area 4a is formed between electrical junction port layers 5.

Since detection area 4a becomes a multi-domain structure when reproducing information, severe Barkhausen noise is generated. Hence, it is required to make detection area 4a a single domain structure to suppress the Barkhausen noise during information reproduction. For that reason, a magnetoresistive device including an antiferromagnetic exchange layer has been proposed.

FIG. 2 is a schematic section of a magnetoresistive device being provided with the antiferromagnetic exchange layer.

Referring to the drawing, soft magnetic layer 2, spacer layer 3 and magnetoresistive layer 4 are successively deposited on substrate 1. Antiferromagnetic exchange layer 6 is deposited on both shoulder portions of magnetoresistive laver 4. Electrical junction port laver 5 is formed on each upper portion of antiferromagnetic exchange layer .

According to the above structure, detection area 4a is maintained in a single domain state by a longitudinal bias is developed by an antiferromagnetic exchange bias. The longitudinal bias is developed by as antiferromagnetic exchange layer 6 deposited in direct contact in the shoulder portions of magnetoresistive layer 4. Also, since coercive force of both shoulder portions of magnetoresistive layer 4 being covered with antiferromagnetic exchange layers 6 becomes greater than that of detection area 4a, a non-detection area in magnetoresistive layer 4 shows reduced reaction to information of the adjacent tracks on a magnetic recording medium.

However, the results of experiments show crosstalk caused by the reaction to the adjacent tracks, though the antiferromagnetic exchange layer. Furthermore, restraining the non-detection area from being detecting is still required for the stable reproduction of information.

SUMMARY OF THE INVENTION

To solve the above problems, it is an object of the present invention to provide a magnetoresistive device in which a magnetic detection function of a non-detection area on a magnetoresistive layer is considerably restrained, and a manufacturing method thereof.

Accordingly, to achieve the above objects, there is provided a magnetoresistive device comprising: a substrate; a soft magnetic layer firmed on the substrate; a spacer layer formed on the soft magnetic layer; a magnetoresistive layer formed on the spacer layer, and having a detection area portion in the middle of the magnetoresistive layer and shoulder portions of which thickness are thinner than that of the detection area portion; an antiferromagnetic exchange layer formed on the shoulder portions of the magnetoresistive layer; and a junction port layer formed on the antiferromagnetic exchange layer.

To achieve the above object, there is provided a method for manufacturing a magnetoresistive device comprising the steps of: forming successively on a substrate a soft magnetic layer, a non-magnetic spacer layer and a magnetoresistive layer; forming a first photoresist pattern as a mask on the magnetoresistive layer to a predetermined width of the magnetoresistive layer, by coating the layer with photoresist and exposing the resulting coated to light; etching all portions of the soft magnetic layer, non-magnetic spacer layer and magnetoresistive layer using said first photoresist pattern as an protective mask; removing the first photoresist pattern; forming, in the middle portion of the magnetoresistive layer, a second photoresist pattern having a narrower width than the magnetoresistive; etching to a predetermined depth both shoulder portions of the magnetoresistive layer which are not covered by the second photoresist pattern, such that the middle portion protrudes more than the shoulder portions to form a detection area; forming an antiferromagnetic exchange layer on each of the shoulder portions of the magnetoresistive layer; removing the second photoresist pattern formed on the detection area of the magnetoresistive layer and removing the antiferromagnetic exchange layer thereon; forming a third photoresist pattern of a narrower width than the detection area on the magnetoresistive layer; forming a junction port layer on the whole surface of the deposited structure; and removing the third photoresist pattern such that the middle portion of the detection area of the magnetoresistive layer is exposed.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
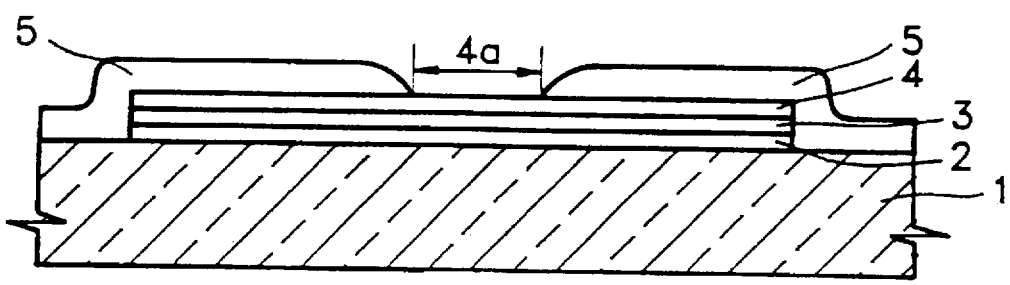
FIG. 1 is a schematic section of a conventional magnetoresistive device without longitudinal bias.
Figure 2:
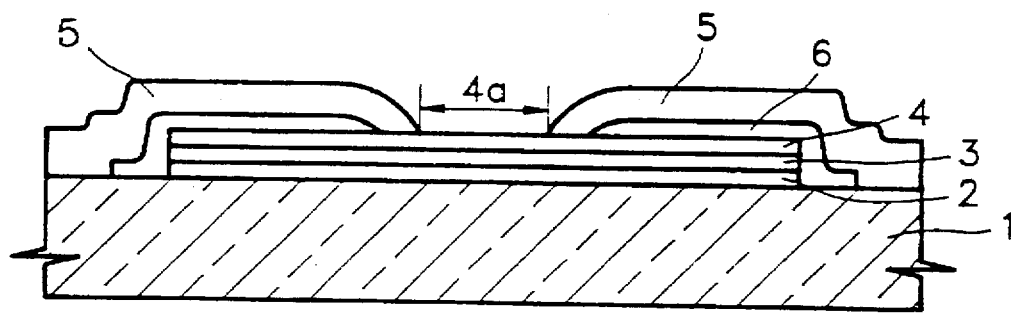
FIG. 2 is a schematic section of a conventional magnetoresistive device with a longitudinal bias developed by an antiferromagnetic exchange layer.
Figure 3:
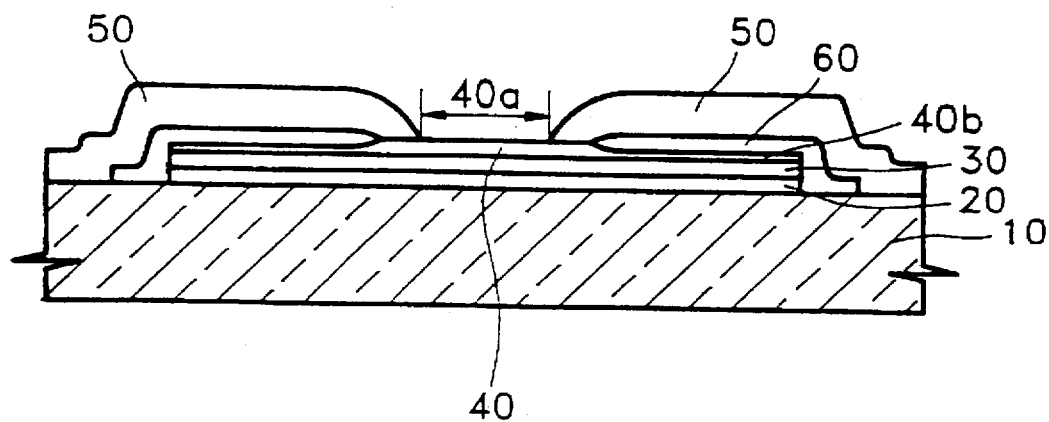
FIG. 3 is a section schematically showing a magnetoresistive device according to the present invention.

FIG. 3 is a view schematically showing a structure of a magnetoresistive device according to the present invention.

In FIG. 3, a soft magnetic layer 20 is formed on a substrate 10 being made of a material such as $Al_2O_3TiC$. A non-magnetic spacer layer 30 and a magnetoresistive layer 40 are successively deposited on soft magnetic layer 20. An antiferromagnetic exchange layer 60 is deposited on both side portions of a detection area 40a on magnetoresistive layer 40, and an electrical junction port layer 50 is formed on each upper portion of antiferromagnetic exchange layers 60. Here, the thickness of detection area 40a, which is a middle portion of magnetoresistive layer 40 is greater than that of a shoulder portion 40b, thereon.

According to such a structure, the sensitivity of shoulder portions 40b of magnetoresistive layer 40 to external magnetic field is lowered due to the layer thickness reduction and due to an increase of a coercive force of magnetoresistive layer 40 in the shoulder portion areas 40b exchange coupled with the antiferromagnetic layer 60 increases with the decrease of the magnetoresistive layer 40 thickness. Thus, the shoulder portions 40b of the magnetoresistive layer 40 do not react to the external magnetic field from adjacent tracks and though do not affect the detection area 40a.

Referring to FIGS. 4 through 13, a manufacturing method to of a magnetoresistive device according to the present invention will be described.

Figure 4:
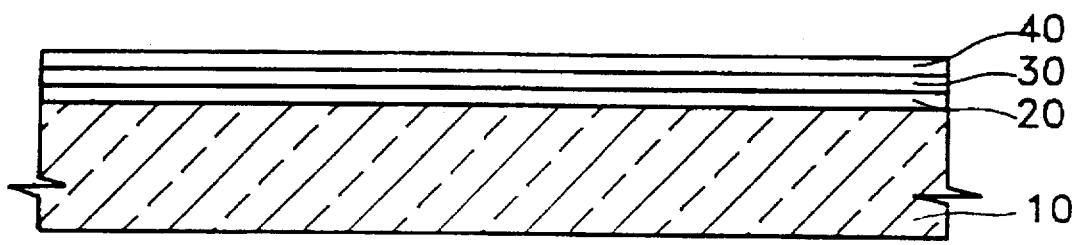
FIGS. 4–13 are process drawings showing an embodiment of a manufacturing method of the present invention.

In FIG. 4, soft magnetic layer 20, non-magnetic spacer layer 30 and NiFe magnetoresistive layer 40 are successively deposited on substrate 10 being made of a material such as $Al_2O_3TiC$. For the material of soft magnetic latter 20, any one among CoZrMo, NiFeCr, NiFePt, NiFeRh and NiFeZr can be used and deposited to the thickness of about 150–500 Å by a common sputtering or deposition method. Also, non-magnetic spacer layer 30 is formed to the thickness of about 100–300 Å in the same way, using a material such as Ti, TiN, Ta, $Al_2O_3$ or $SiO_2$.

Figure 5:
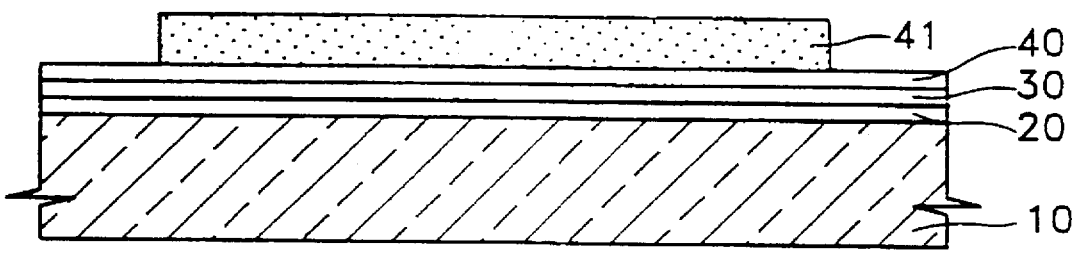

In FIG. 5, a first photoresist pattern 41 as a mask is formed to a predetermined width of the above deposited magnetoresistive layer 40. First photoresist pattern 41 used as a mask is obtained by coating photoresist on the above resultant and etching the coated photoresist in a common photolithography method.

Figure 6:
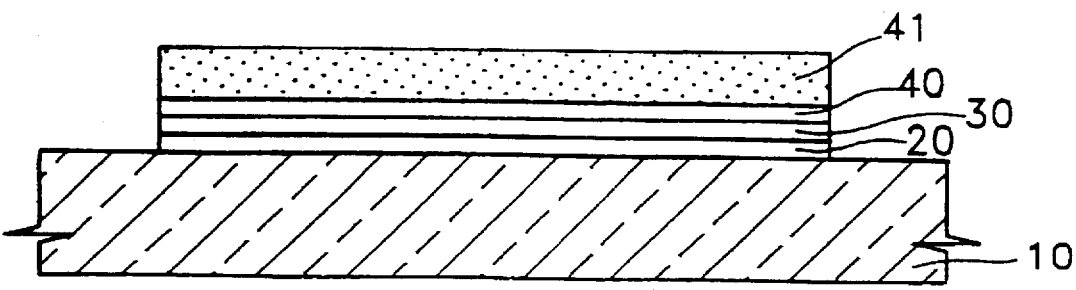
Figure 7:
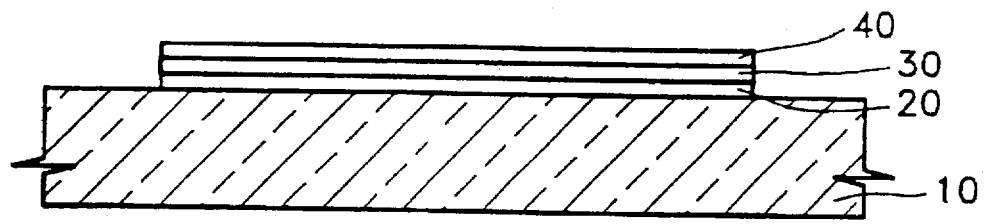

In FIG. 6, all portions of the deposition is etched using an ion beam, exclusive of a portion being covered by first photoresist pattern 41. First photoresist pattern 41 is then removed by using a predetermined solvent, as shown in FIG. 7.

Figure 8:
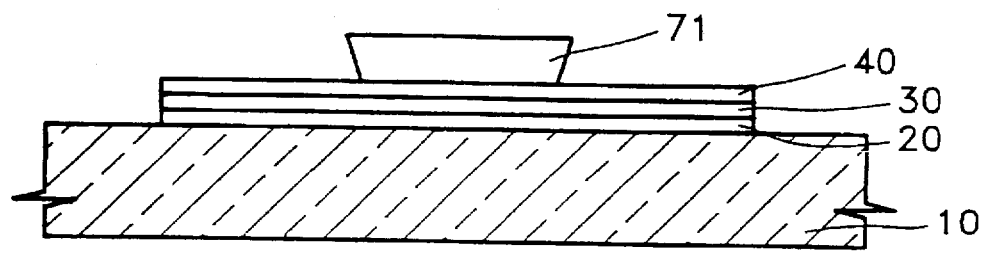

In FIG. 8, a second photoresist pattern 71 is formed on the middle portion of magnetoresistive layer 40. Second photoresist pattern 71 is obtained by coating the photoresist on the whole surface of magnetoresistive layer 40 and etching the coated photoresist in the photolithography method.

Figure 9:
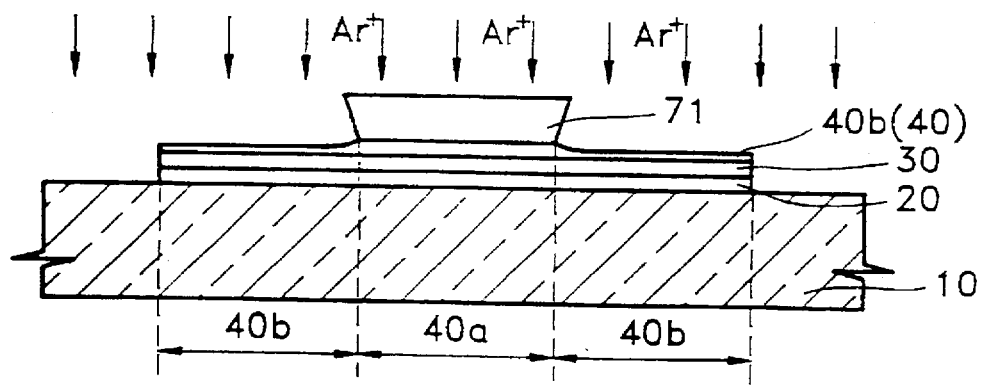

In FIG. 9, shoulder portions 40b, not being covered with second photoresist pattern 71, are formed to have a thickness of less than the middle portion of detection area 40a, by dry-etching magnetoresistive layer 40 utilizing $Ar^+$ ions.

Figure 10:
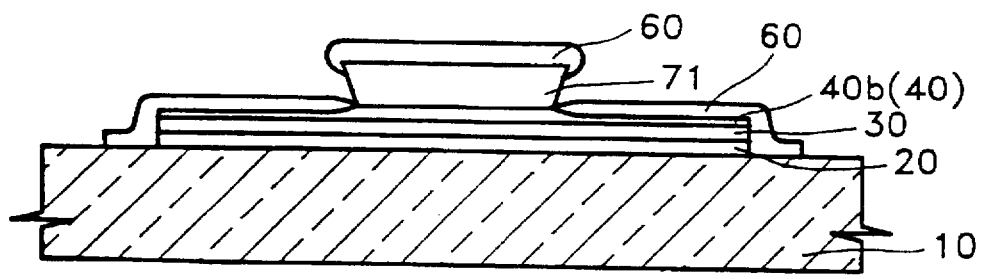

In FIG. 10, antiferromagnetic exchange layer 60 is formed to the thickness of 100–400 Å on each shoulder portion 40b and second photoresist pattern 71, by depositing a material such as FeMn, NiMn, $\alpha Fe_2O_3$, using the sputtering or deposition method.

Figure 11:
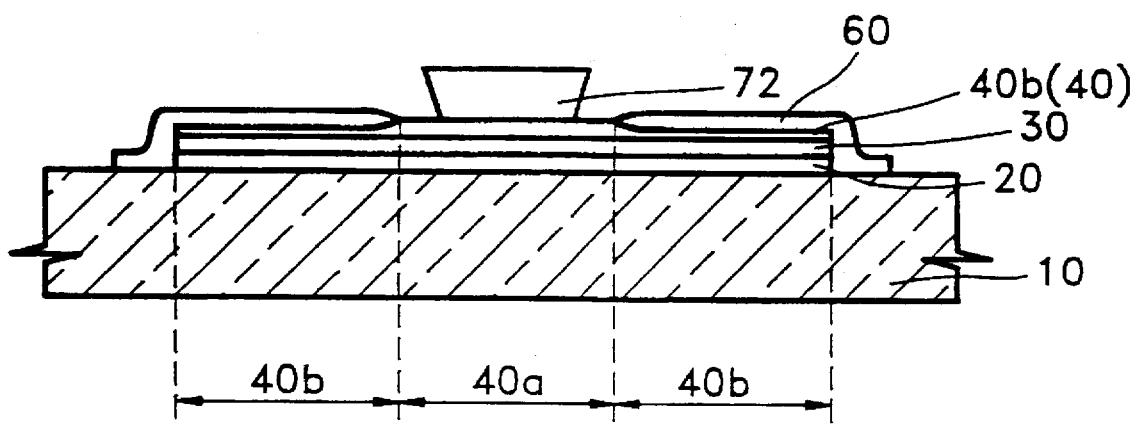

After second photoresist pattern 71 and antiferromagnetic exchange layer 60 formed thereon are removed In FIG. 11, a third photoresist pattern 72 is formed in the middle of magnetoresistive layer 40. That is, in removing the second photoresist pattern and antiferromagnetic exchange layer 60 by a lift-off method, each of the boundary portions of detection area 40a, which are next to shoulder portions 40b, are exposed with a predetermined space. Then, third photoresist pattern 70 is formed to be narrower than detection area 40a.

Figure 12:
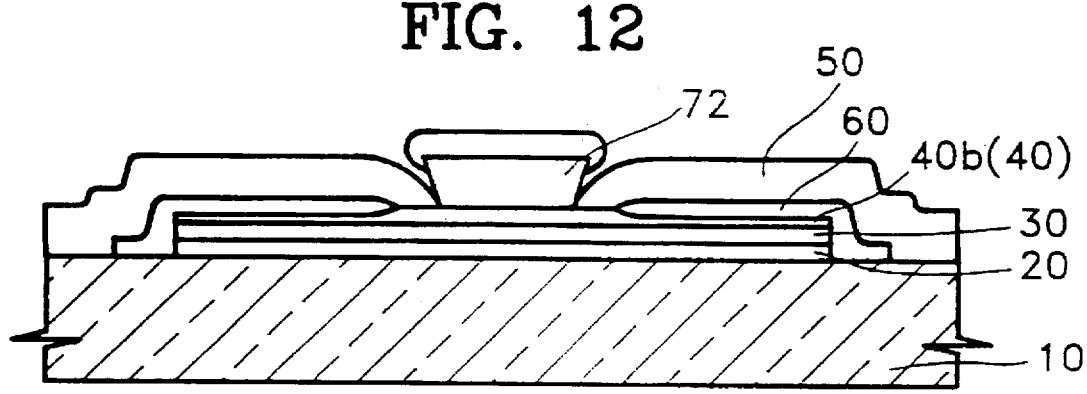

In FIG. 12, electrical junction port layer 50 is formed to the thickness of 1000–3000 Å on the above resultant. Here, an, one among Ta/Au/Ta, Ti/Au/Ti, Mo/Au/Mo and AlCu can be used as a material for electrical junction port layer 50.

Figure 13:
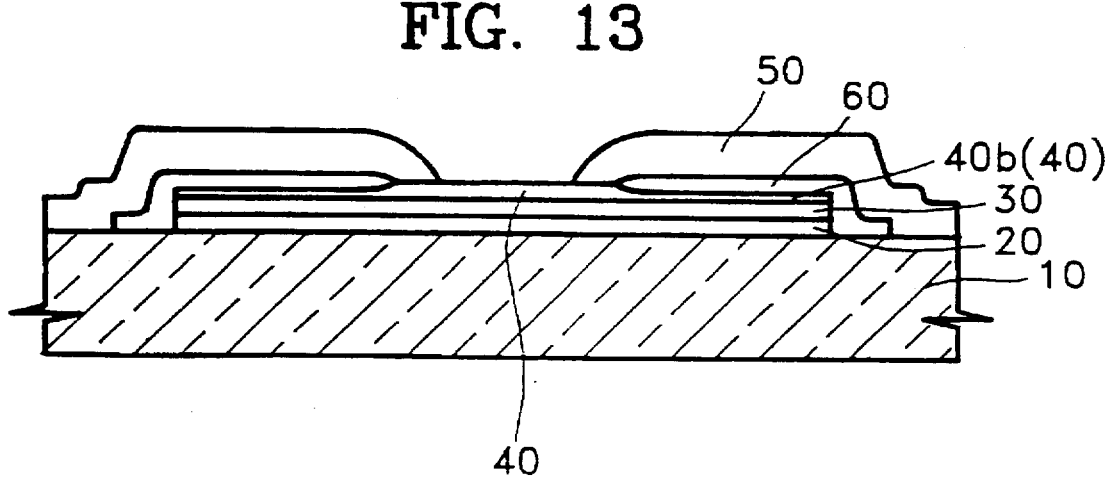

In FIG. 13, the desired magnetoresistive device is finally obtained by removing third photoresist pattern 72 and electrical junction port layer 50 formed thereon.

In the method of the present invention, the processes of forming second photoresist pattern 71 and etching using $Ar^+$ ions are performed in order to obtain shoulder portion 40b of a thinner width than detection area 40a.

As described above, in the magnetoresistive device of the present invention, the shoulder portions which perform exchange coupling with the antiferromagnetic exchange layer show a weak reaction to an external magnetic field, because of increased coercive force and reduced thickness. Thus, when information on and one track of an information recording medium is read out by the detection area, the shoulder portion only slightly reacts to the external magnetic field from the adjacent tracks, i.e. the affect on the detection area by the shoulder portions is minimized.

The present invention has been described by way of exemplary embodiments, which are illustrative and not restrictive of the scope of the invention. The scope of the present invention is defined instead by the appended claims and equivalents thereof in light of the specification.

What is claimed is:

1. A method for manufacturing a magnetoresistive device comprising the steps of:

forming successively on a substrate a soft magnetic layer, a non-magnetic spacer layer and a magnetoresistive layer;

forming a first photoresist pattern as a mask on the magnetoresistive layer, by coating the layer with photoresist and exposing the coated result to light;

etching all portions of the soft magnetic layer, non-magnetic spacer layer and magnetoresistive layer to form a deposited structure using said first photoresist pattern as a protective mask;

removing the first photoresist pattern;

forming, in the middle portion of the deposited structure, a second photoresist pattern having a narrower width than the deposited structure;

etching to a depth both shoulder portions of the magnetoresistive layer which are not covered with the second photoresist pattern, such that the middle portion is protrudes more than the shoulder portions to form a detection area;

forming an antiferromagnetic exchange layer in direct contact with each of the shoulder portions of the magnetoresistive layer;

removing the second photoresist pattern formed on the detection area of the magnetoresistive layer and removing a portion of the antiferromagnetic exchange layer thereon;

forming a third photoresist pattern of a narrower width than the detection area on the magnetoresistive layer;

forming a junction port layer on the whole surface of the deposited structure; and removing the third photoresist pattern such that the middle portion of the detection area of the magnetoresistive layer is exposed.

2. A method for manufacturing a magnetoresistive device according to claim 1, wherein said soft magnetic layer consists of one of the following magnetic materials: CoZrMo, NiFeCr, NiFePt, NrFeRh, and NiFeZr.

3. A method for manufacturing a magnetoresistive device according to claim 1, wherein said soft magnetic layer is formed to have a thickness in the range of 150–500 Å.

4. A method for manufacturing a magnetoresistive device according to claim 1, wherein said junction port layer is formed of at least one of the following combination of layers: Ta/Au/Ta, Ti/Au/Ti, and Mo/Au/Mo or AlCu.

5. A method for manufacturing a magnetoresistive device according to claim 1, wherein said junction port layer is formed to have a thickness in the range of 1,000–3,000 Å.

6. A method for manufacturing a magnetoresistive device according to claim 1, wherein said anti-ferromagnetic exchange layer is formed of one of the following antiferromagnetic materials: FeMn, NiMn, $\alpha$-$Fe_2O_3$.

7. A method for manufacturing a magnetoresistive device according to claim 1, wherein said anti-ferromagnetic exchange layer is formed to have a thickness in the range of 100–400 Å.

8. A method for manufacturing a magnetoresistive device according to claim 1, wherein said spacer layer is formed of one of the following non-magnetic materials: Ti, TiN, Ta, $Al_2O_3$ and $SiO_2$.

9. A method for manufacturing a magnetoresistive device according to claim 1, wherein said magnetoresistive layer is formed of $Al_2O_3TiC$.

10. A method of manufacturing a magnetoresistive device according to claim 1, wherein said etching process for the shoulder portions is a dry etching process.

* * * * *